United States Patent
Delfs et al.

(10) Patent No.: US 12,275,507 B2
(45) Date of Patent: Apr. 15, 2025

(54) SYSTEM FOR DETECTING A MAN-OVERBOARD EVENT

(71) Applicant: ANSCHÜTZ GMBH, Kiel (DE)

(72) Inventors: Michael Delfs, Kiel (DE); Hinrich Kahl, Kiel (DE); Werner Lindner, Kiel (DE); Bernhard Steuernagel, Kiel (DE); Oliver Welzel, Kiel (DE); Markus Werner, Kiel (DE); Michael Wessel, Kiel (DE)

(73) Assignee: ANSCHÜTZ GMBH, Kiel (DE)

( * ) Notice: Subject to any disclaimer, the term of this patent is extended or adjusted under 35 U.S.C. 154(b) by 208 days.

(21) Appl. No.: 17/773,153

(22) PCT Filed: Oct. 30, 2020

(86) PCT No.: PCT/DE2020/100926
§ 371 (c)(1),
(2) Date: Apr. 29, 2022

(87) PCT Pub. No.: WO2021/083463
PCT Pub. Date: May 6, 2021

(65) Prior Publication Data
US 2022/0396340 A1    Dec. 15, 2022

(30) Foreign Application Priority Data
Nov. 1, 2019 (DE) .......................... 102019129559.9

(51) Int. Cl.
*B63C 9/00*   (2006.01)
*G06V 20/52*  (2022.01)

(52) U.S. Cl.
CPC ............ *B63C 9/0005* (2013.01); *G06V 20/52* (2022.01)

(58) Field of Classification Search
CPC ....... B63C 9/0005; G06V 20/52; G08B 21/08
See application file for complete search history.

(56) References Cited

U.S. PATENT DOCUMENTS

| | | | |
|---|---|---|---|
| 2008/0207067 A1* | 8/2008 | Ricciuti | H04B 10/118 441/11 |
| 2012/0224063 A1* | 9/2012 | Terre | H04N 23/11 348/148 |

(Continued)

FOREIGN PATENT DOCUMENTS

| | | |
|---|---|---|
| DE | 259177 | 8/1988 |
| DE | 102018127664 | 5/2019 |

(Continued)

*Primary Examiner* — Khoi H Tran
*Assistant Examiner* — Dairon Estevez
(74) *Attorney, Agent, or Firm* — Jordan IP Law, LLC

(57) ABSTRACT

A system for detecting a man-overboard event, comprising a plurality of first computing units having at least one optical sensor with a predetermined detection range and a second computing unit connected to the plurality of computing units, characterized in that each first computing unit is designed, independently of the others, to evaluate the data sensed by the at least one optical sensor of the respective first computing unit to determine whether a man-overboard event is present on the basis of these data and, when a man-overboard event is present, to report this to the second computing unit,
    wherein the second computing unit is designed to output an alarm and/or a control command to carry out a man-overboard manoeuvre.

9 Claims, 2 Drawing Sheets

(56) References Cited

U.S. PATENT DOCUMENTS

| | | |
|---|---|---|
| 2012/0229282 A1 | 9/2012 | Zagami et al. |
| 2013/0169809 A1* | 7/2013 | Grignan ................. G08B 21/08 |
| | | 348/148 |
| 2014/0285672 A1* | 9/2014 | Hogasten ................. H04N 5/33 |
| | | 348/164 |
| 2016/0267766 A1 | 9/2016 | Inchausti |
| 2018/0043977 A1* | 2/2018 | Assal ..................... G06V 40/23 |
| 2019/0137620 A1* | 5/2019 | Cappelletti ........... G01S 13/886 |
| 2020/0012283 A1* | 1/2020 | Nguyen ............... G05D 1/0206 |
| 2022/0101713 A1* | 3/2022 | Fillbrandt .............. G08B 21/08 |

FOREIGN PATENT DOCUMENTS

| | | | | |
|---|---|---|---|---|
| GB | 2493390 | | 2/2013 | |
| GB | 2540811 | | 2/2017 | |
| JP | 2018048976 A | * | 3/2018 | |
| WO | WO-2006061864 A1 | * | 6/2006 | ............. B63J 99/00 |

* cited by examiner

SYSTEM FOR DETECTING A MAN-OVERBOARD EVENT

CROSS-REFERENCE TO RELATED APPLICATIONS

This application represents the U.S. National Phase of International Application number PCT/DE2020/100926, entitled "System for Detecting Man-Overboard Event", filed on 30 Oct. 2020, which claims benefit to German patent document DE102019129559.9, filed 1 Nov. 2019, all of which are incorporated herein by reference.

BACKGROUND OF THE INVENTION

The invention relates to a system for detecting a man-overboard event, including a plurality of computer units including at least one optical sensor having a predetermined detecting region, and an alert server connected to the plurality of computing units.

Movement using watercraft on the water surface entails that people fall from the watercraft over the watercraft's side into the water. This event, referred to as "man overboard" or in short MOB, requires the immediate initiating of rescue measures of the person gone overboard, wherein such a man-overboard maneuver has the highest priority for all concerned parties in the event of a man-overboard event.

Rapid and deliberate action is essential for survival of the person gone overboard, since on the one hand the risk is very high for the ship crew to lose sight of the point where the victim fell, on the other hand the risk is very high of acute danger to the life of the person gone overboard.

Thus, for example, approximately 40 to 50 people go overboard worldwide yearly from cruise ships, of those statistically only a little more than 10% are found and survive the event. Here it is problematic in particular that in the statistical average, from the moment at which a goes overboard up to the confirmation that a man-overboard event actually exists, approximately 15 minutes pass, and—due also to its speed and a relatively long stop distance of approximately one nautical mile—on average the ship has moved seven to eight nautical miles from the location of the accident before a man-overboard maneuver can be initiated for the rescue of the victim.

Depending on the travel speed and the position of the person with respect to the ship, man-overboard maneuvers known in the heavy shipping industry as Single Turn, Williamson Turn, or Schamow Turn are performed that make possible a stopping of the ship at a short distance and upwind of the person in the water, who for the rescue should be located, to the extent possible, abeam of the ship approximately mid-ship.

Known systems for detecting, verifying, and registering an incident requiring a man-overboard maneuver consist here, for example, of the above-mentioned system including a plurality of cameras or other sensors disposed on the ship, each in the region of the ship's side, that are connected to a server configured for (video) analysis and alerting. Here all cameras of the system respectively transmit a video- or sensor-data stream to a (video) analysis server, which evaluates the image data delivered by the sensors and/or cameras, and in the event of detection of a person going overboard transmits a corresponding alert signal in an image stream to a terminal, connected to the server, located on the ship bridge, from which terminal the measures required for the rescue of the person gone overboard can be initiated.

Disadvantageous in these known systems is the fault- and failure-vulnerability of the system: on the one hand, the video analysis server must permanently process a variety of (video) data received by the cameras (or sensors), with the result that the processing of this data requires not only a high computing capacity, but also a certain amount of time; on the other hand the network (Ethernet) is continuously burdened here by a very high data load due to the videos. Here delay time differences of the data sent by the individual cameras are also to be taken into account in order to make possible a precise position determination of the person gone overboard in relation to the movement of the ship, whereby the speed with which a man-overboard event can be identified is further reduced. Finally, the system is also completely ineffective when the video analysis server is overloaded or defective.

SUMMARY OF THE INVENTION

The object of the present invention is therefore to provide a system for detecting a man-overboard event, which system makes possible a rapid detecting of a man-overboard event, and is simultaneously as fail-safe as possible as well as less fault-susceptible.

This object is achieved according to the invention by the system having the features of claim 1. The dependent claims represent advantageous designs of the invention. Instead of a system having centralized evaluation with a plurality of peripherally disposed video cameras and a centrally disposed video analysis- and alerting-server connected thereto, the basic idea of the invention is to provide a decentralized system construction, wherein each individual camera, which can include a plurality of sensors, is respectively equipped with its own intelligence that allows the determining of incidents/events on the one hand, and then on the other hand allows the determining of a man-overboard event for the region recorded from the respective camera. Since the data detected by the cameras are no longer centrally processed successively by a single server, but rather in parallel and simultaneously with respect to one another, valuable time can be saved for the rescue of the person gone overboard.

In particular, various optical sensors, primarily cameras, but also LiDAR sensors, are used in the cameras, wherein the processing of the sensor data is effected in a decentralized manner. The processed data are then preferably transferred to a data and event server, and subsequently transmitted to the supplementary navigation system for the alert verification, optionally for display, for data recording, for nautical support, and for a possible activation of optional actuators.

The optical sensors including first computing units respectively include at least one infrared light source, as well as optical sensors in the human range of vision, infrared range, and in the thermal range. A particularly simple design can be achieved when an infrared light source and an optical sensor capturing light in the human range of vision, in particular a camera, is used, so that a thermal camera can be omitted.

The first computing units are connected to a second computing unit, wherein each first computing unit is configured independently of the others for evaluating the data sensed by at least one optical sensor of the respective first computing unit; the data are then used by the first computing unit for the generation of event signals (referred to below as "events"). These events are then used in the second computing unit, spatially separated from the first computing units, for determining whether a man-overboard event has occurred as well as for alerting.

The first computing units are preferably connected to the second computing unit using an IT infrastructure, in particular via Ethernet with or without PoE supply that is configured according to standard (e.g., according to IEEE 802.3bt). Alternatively radio connections can also be used. The second event-processing and representing computing unit is configured solely for output of an alert (including the corresponding video sequences) for carrying out a man-overboard maneuver. In addition, the second computing unit can check whether the individual first computing units are active, in particular functional—conversely, an analysis of the sensor data with respect to a man-overboard event and verification or registration of an event is not undertaken by the second computing unit.

Starting from the fact that an average cruise ship routinely requires 12 monitoring points, according to the prior art with two cameras per monitoring point a total of 24 video streams were sent to a central video analysis server and must be processed by it. Here an average, compressed video data stream in HD resolution used approximately 7 Mbit/s per camera, so that an IT infrastructure having 168 Mbit/s had to be provided.

Overall the network structure can be configured to be less complex, since only the occurrence of events or events as such must be reported, but all video data streams of all first computer units need not be transmitted in parallel.

At the same time, on the bridge of the ship the alerting of a man-overboard event is effected directly on the second computing unit. The image for the alerting of a man-overboard event then appears directly on the screen of the navigation system and prompts the driving officer for an assessment. In addition to the alert, the associated video of the monitoring point is shown that has indicated the occurrence of the man-overboard event. Based on the provided videos, the driving officer determines whether it is a man-overboard event, and correspondingly initiates a man-overboard maneuver. A registration is effected with the alert management system of the bridge and in the voyage data recorder. Alternatively the alerting server can be configured such that it actively engages into the longitudinal- and lateral-dynamic controlling of the watercraft for carrying out a man-overboard maneuver. For this purpose a connecting of the man-overboard system to the navigation system is required.

According to the invention a system for detecting a man-overboard event is thus proposed, including a plurality of first computing units including at least one optical sensor having a predetermined detecting region, and a second computing unit connected to the plurality of first computing units, wherein each first computing unit is configured independently of one another for evaluating the data sensed by at least one optical sensor of the respective first computing unit, which data are then used for the generation of events by the first computing unit. These events are then used in the second computing unit for determining whether a man-overboard event has occurred, wherein the second computing unit is configured for the outputting of an alert and/or of a control command for carrying out a man-overboard maneuver.

The second computing unit correspondingly carries out no video analysis of image data, but is preferably configured to query the functioning of the first computing units connected thereto. This can be effected at predetermined intervals that are designed, for example, at regular intervals, wherein a failure or defect of a first computing unit can thus be quickly recognized without the rest of the system being non-functional.

In addition, the second computing unit is preferably formed from an event server, which is configured for receiving and storing of events received from the first computing unit, and an alert computer connected to the event server, which alert computer is configured for the processing of events received from the event server, from whose combination a man-overboard event is then filtered and configured for the output of an alert and/or of a control command for carrying out a man-overboard maneuver.

In particular, the second computing unit, in particular the alert computer, is preferably configured to output an alert and/or a control command only when further parameters are fulfilled. Thus the second computing unit, in particular the alert computer, may submit a plausibility check of the second computing unit, in particular on the data stored in the event sever, and output an alert and/or a control command only when the data fulfill the criteria underlying the checking or evaluation.

At least one first computing unit preferably includes a plurality of optical sensors that have an overlapping detecting region. This design correspondingly allows the evaluation of an in particular nearly identical detecting region by different means, so that the evaluating of data of different optical sensors increases the accuracy in the determining of a man-overboard event.

Furthermore, it is preferably provided that at least one first computing unit includes an infrared light source with an infrared radiator in the detecting region of the radiating radiation area of the at least one sensor. The infrared light source radiates infrared light up to at most 830 nm and illuminates the detecting region of the sensors, in particular the daylight camera.

According to a further preferred design, the at least one optical sensor is a daylight camera or a thermal camera. The daylight camera preferably records video images in the visible spectrum, as well as infrared light up to a wavelength of at most 830 nm. However, the thermal camera preferably has a detection spectrum of 8 µm to 14 µm.

However, it is preferably provided in particular that each first computing unit includes a plurality of optical sensors that are selected from the group of sensors composed of a daylight camera and a thermal camera. Thus according to a particularly preferred exemplary embodiment, it is provided that each first computing unit includes an infrared light source as well as a daylight camera and a thermal camera.

In addition, it is specifically provided that each first computing unit includes an optical and/or acoustic alert means that is configured to output an alert signal in the event of a man-overboard event. This can be activated independently of the connection to the second computing unit, so that directly on the site attention can be called to a man-overboard event.

Finally, according to the invention a watercraft is also provided including the system described above, on the side of which watercraft the plurality of first computing units is disposed. In particular, the first computing units are configured and arranged with respect to one another such that the optical sensors of at least two first computing units have an overlapping detecting region.

A particularly rapidly acting system is preferably provided in that the system for carrying out a man-overboard maneuver is configured to act on the longitudinal- and lateral-dynamic controlling of the watercraft. Here the execution of the man-overboard maneuver is effected according to the current course, the position of the ship at the time of the man-overboard event, taking into account the relative position of the event with respect to the ship, as well as the wind—and current-conditions. In particular, for this purpose it is provided that a transmission of the alert is effected with a time stamp from the man-overboard system to the navigation system, wherein further data are also provided, in particular the ship side relevant to the alarm, the relative ship length, the fall height, and/or the image or video of the man-overboard event, and recorded together as a man-overboard entry into the electronic ship logbook. This is specifically connected to the geographical position, weather, wind, and current data from the navigation system. A return transmission of data from the navigation system to the man-overboard system is also included in this regard.

BRIEF DESCRIPTION OF THE FIGURES

The invention is explained in more detail in the following based on a particularly preferably configured exemplary embodiment depicted in the accompanying drawings.

FIG. 1 shows, by way of example, a cruise ship 100 including a plurality of first computing units 10 disposed on it, the optical sensors of which computing units 10 each have a nearly identical detecting region 20, wherein the detecting region 20 of the optical sensors of different first computing units also partially overlap. For the daylight camera and thermal camera installed in each first computing unit 10, the detecting region 20 of each first computing unit 10 is depicted by the dashed lines. In particular, the first computing units 10 include an infrared light source as well as a daylight camera and a thermal camera. The first computing units 10 are connected to a (not depicted) second computing unit, wherein, however, each first computing unit 10 is configured independently of one another for evaluating the data sensed by at least one sensor of the respective first computing unit 10, which data are then used for the generation of events by the first computing unit. These events are used in the second computing unit for determining whether a man-overboard event has occurred. The first computing units 10 are connected to the second computing unit using an IT infrastructure, in particular via Ethernet with PoE, which is specifically configured according to the IEEE 802.3bt standard. In addition to the determining of a man-overboard event from the combination of events reported by the event server, the second computing unit is configured to output an alert and/or a control command for carrying out a man-overboard maneuver. In addition, the second computing unit can check whether the individual computing units 10 are active, in particular functional—in contrast, an analysis of the sensor data with respect to a man-overboard event is not undertaken by the event server.

The second computing unit includes a (not depicted) optical and acoustic alert means that is configured to output an alert signal in the event of a man-overboard event.

Figure 1:
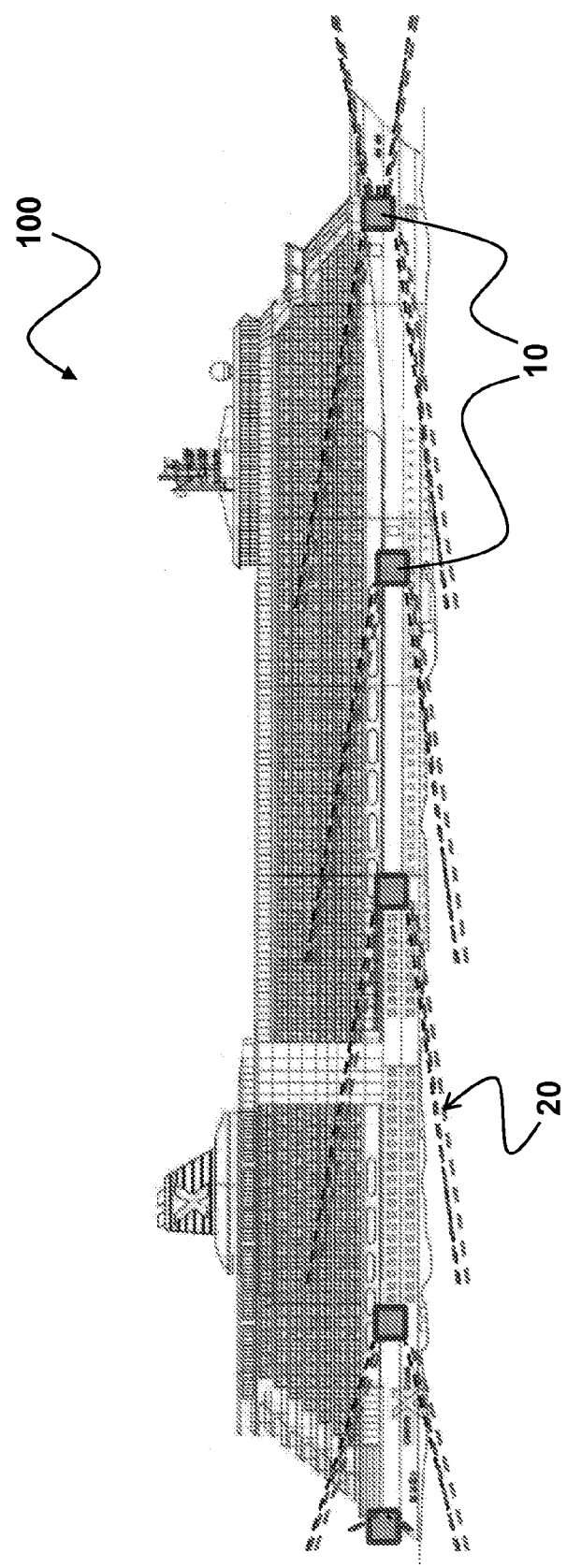
FIG. 1 shows a schematic side view of a cruise ship equipped with the inventive system.
Figure 2:
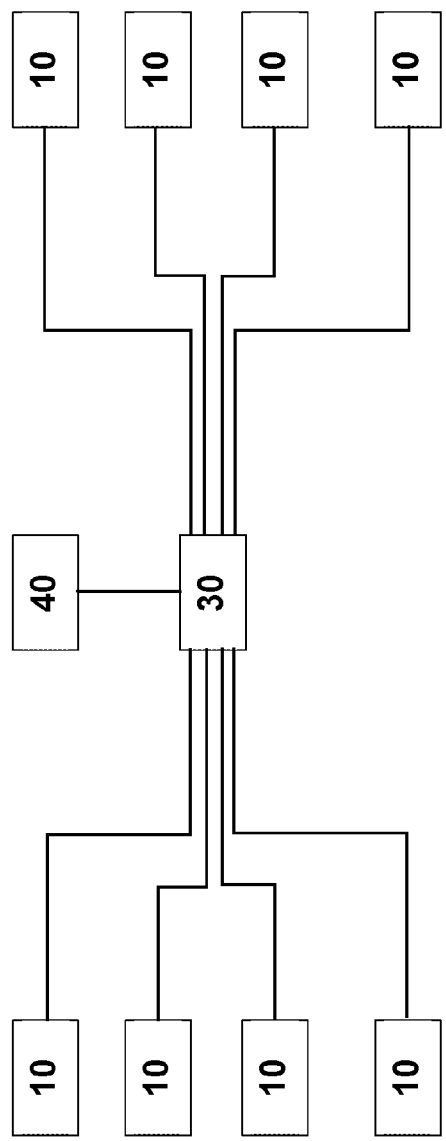
FIG. 2 shows a schematic view of a particularly preferably configured system according to the invention.

FIG. 2 shows a schematic design of a particularly preferably configured system according to the invention. In particular, FIG. 2 shows a system for detecting a man-overboard event, including a plurality of first computing units 10, including at least one sensor having a predetermined detecting region, which are each connected to an event server 30. Each first computing unit 10 is configured independently for the evaluation of data sensed by the at least one sensor of the respective first computing unit 10 and reported events, for reporting (event) to the event server 30.

With the alert server 40 connected thereto, the event server 30 forms the preferred design of the second computing unit according to the invention, wherein the alert server 40 is configured for output of an alert and/or, with connecting to the navigation system, output of a control command for carrying out a man-overboard maneuver. These events are used in the second computing unit for determining whether a man-overboard event has occurred. In particular, the alert server 40 can subject the events transmitted to the event server 30 to a further testing or evaluation, and taking into account of further criteria can output or suppress an alert and/or a corresponding control command.

The invention claimed is:

1. A system for detecting a man-overboard event, including:
   a plurality of first computing units, each first computing unit including at least one daylight camera detecting light in a visible spectrum and infrared light with a maximum wavelength of 830 nm within a predetermined detecting region and including an infrared light source radiating into the predetermined detection region of the daylight camera,
   a second computing unit including a processor and a communicator connected to the plurality of first computing units, wherein each first computing unit, independently of one another, is configured:
   to evaluate data sensed by the daylight camera from light reflected in a human visual range from the infrared light source of the respective first computing unit,
   to determine whether a man-overboard event is present, based on this data, and
   to report a man-overboard event, to the second computing unit, wherein the second computing unit is includes an alarm configured to send an alert and/or of a control command for carrying out of a man-overboard maneuver.

2. The system according to claim 1, wherein the plurality of first computing units includes a plurality of optical sensors, wherein the optical sensors have an overlapping detecting region.

3. The system according to claim 1, wherein the second computing unit includes an event server that is configured to receive and store events transmitted from the first computing units to the event server, and includes an alert computer connected to the event server, which alert computer is configured to process events received by the event server and to output an alert and/or of a control command for carrying out of the man-overboard maneuver.

4. The system according to claim 1, wherein the alarm is an optical and/or acoustic alarm that is configured to output an alert signal in the event of a man-overboard event.

5. A watercraft including a system for detecting a man-overboard event, the system including:
   a plurality of first computing units each first computing unit including at least one daylight camera detecting light in a visible spectrum and infrared light with a maximum wavelength of 830 nm within a predetermined detecting region and including an infrared light source radiating into the predetermined detection region of the daylight camera, and
   a second computing unit connected to the plurality of first computing units, wherein each first computing unit, independently of one another, is configured:

to evaluate data sensed by the daylight camera from light reflected in a human visual range from the infrared light source of the respective first computing unit, to determine whether a man-overboard event is present, based on this data, and to report a man-overboard event, to the second computing unit, wherein the second computing unit includes an alarm configured to send an alert and/or of a control command for carrying out of a man-overboard maneuver.

6. The watercraft according to claim 5, wherein the daylight cameras of at least two first computing units have an overlapping detecting region.

7. The watercraft according to claim 5, wherein the system for carrying out a man-overboard maneuver is configured to act on longitudinal- and lateral-dynamic controlling of the watercraft.

8. The watercraft according to claim 5, wherein the second computing unit is includes an event server that is configured to receive and store events transmitted from the first computing units to the event server, and includes an alert computer connected to the event server, which alert computer is configured to process events received by the event server and to output an alert and/or of a control command for carrying out of the man-overboard maneuver.

9. The watercraft according to claim 5 wherein the alarm is configured for outputting of an alert signal in the event of a man-overboard event.

* * * * *